(12) United States Patent
Bai et al.

(10) Patent No.: US 11,486,172 B2
(45) Date of Patent: Nov. 1, 2022

(54) REFUELING OR CHARGING PORT DOOR LOCK ASSEMBLY

(71) Applicant: ILLINOIS TOOL WORKS INC., Glenview, IL (US)

(72) Inventors: Jianwei Bai, Shanghai (CN); Yifan Wang, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 902 days.

(21) Appl. No.: 16/230,868

(22) Filed: Dec. 21, 2018

(65) Prior Publication Data

US 2019/0194985 A1 Jun. 27, 2019

(30) Foreign Application Priority Data

Dec. 27, 2017 (CN) .......................... 201711445559.5

(51) Int. Cl.
*E05B 83/34* (2014.01)
*B60L 53/16* (2019.01)
(Continued)

(52) U.S. Cl.
CPC .............. *E05B 83/34* (2013.01); *B60L 53/16* (2019.02); *B60K 15/05* (2013.01);
(Continued)

(58) Field of Classification Search
CPC .......... E05B 83/34; E05B 77/42; E05B 83/28; E05B 63/22; B60L 53/16; B60L 50/50;
(Continued)

(56) References Cited

U.S. PATENT DOCUMENTS 4,688,695 A * 8/1987 Hirohata ................ G11B 33/08
49/386
5,718,309 A * 2/1998 Kariya ...................... F16F 9/12
188/290
(Continued)

FOREIGN PATENT DOCUMENTS

CN 102317125 A * 1/2012 ................ F16F 9/12
CN 202689736 U 1/2013
(Continued)

OTHER PUBLICATIONS

First Office Action from corresponding Chinese Patent Application No. 201711445559.5, dated May 14, 2021 (8 pages) (includes English translation).
(Continued)

*Primary Examiner* — Kristina R Fulton
*Assistant Examiner* — Tal Saif
(74) *Attorney, Agent, or Firm* — Quarles & Brady LLP

(57) ABSTRACT

A door lock assembly includes a housing having a hollow structure, a lifting shaft provided inside the housing, a driving spring, and a buffering device. A top end of the lifting shaft is configured for assembling a refueling or charging port flap, the lifting shaft being slidably engaged with the housing along a first portion and threadably engaged with the housing along a second portion. One end of the driving spring is fixed and the other end abuts against the lifting shaft for driving the lifting shaft to move relative to the housing. The buffering device provides a buffering function in the when the lifting shaft is threadably engaged with the housing.

18 Claims, 13 Drawing Sheets

(51) Int. Cl.
*E05B 77/42* (2014.01)
*B60L 50/50* (2019.01)
*B60K 15/05* (2006.01)

(52) U.S. Cl.
CPC ............... *B60K 2015/0515* (2013.01); *B60K 2015/0561* (2013.01); *B60L 50/50* (2019.02); *B60L 2270/32* (2013.01); *B60Y 2200/91* (2013.01); *E05B 77/42* (2013.01); *E05Y 2900/534* (2013.01)

(58) Field of Classification Search
CPC ............... B60L 2270/32; B60K 15/05; B60K 2015/0515; B60K 2015/0561; B60K 15/04; B60K 2015/0507; B60K 2015/0538; B60K 2015/0419; B60K 2015/053; B60Y 2200/91; Y10S 292/04; Y02T 90/14; Y02T 10/7072; Y02T 10/70; E05Y 2900/534
See application file for complete search history.

(56) References Cited

U.S. PATENT DOCUMENTS

| | | | | |
|---|---|---|---|---|
| 6,041,899 | A * | 3/2000 | Takamatsu | F16F 9/12 188/290 |
| 6,085,384 | A * | 7/2000 | Bivens | E05F 3/14 16/50 |
| 8,585,119 | B2 * | 11/2013 | Beck | E05B 83/34 296/97.22 |
| 9,493,967 | B2 * | 11/2016 | Basavarajappa | B60K 15/05 |
| 2005/0280266 | A1 * | 12/2005 | Mueller | E05B 77/42 292/336.3 |
| 2011/0120823 | A1 * | 5/2011 | Hansen | E01F 13/028 404/13 |
| 2012/0242095 | A1 | 9/2012 | Niwa et al. | |

FOREIGN PATENT DOCUMENTS

| | | | | |
|---|---|---|---|---|
| CN | 203427905 | U | 2/2014 | |
| CN | 104129280 | A | 11/2014 | |
| CN | 204283009 | U | 4/2015 | |
| CN | 204738638 | U | 11/2015 | |
| CN | 205955442 | U | 2/2017 | |
| CN | 107009889 | A | 8/2017 | |
| CN | 107060538 | A | 8/2017 | |
| CN | 206581746 | U | 10/2017 | |
| CN | 206766151 | U | 12/2017 | |
| DE | 10304701 | A1 * | 8/2004 | ............ B60K 15/05 |
| DE | 102009008496 | A1 * | 8/2010 | ............ B60K 15/04 |
| DE | 102013008550 | A1 | 11/2014 | |
| IT | 1428914 | B | 6/2017 | |
| JP | H07229334 | A | 8/1995 | |
| JP | 3128787 | U * | 1/2007 | |
| JP | 2012251299 | A | 12/2012 | |
| JP | 2016223150 | A | 12/2016 | |
| KR | 100861400 | B1 * | 10/2008 | |
| KR | 20170031883 | A | 3/2017 | |
| WO | WO-2010058304 | A1 * | 5/2010 | ............ B60K 15/05 |
| WO | 2016139690 | A1 | 9/2016 | |

OTHER PUBLICATIONS

First Search Report from corresponding Chinese Patent Application No. 201711445559.5, dated May 6, 2021 (3 pages).

* cited by examiner

A-A

REFUELING OR CHARGING PORT DOOR LOCK ASSEMBLY

CROSS REFERENCE TO RELATED APPLICATIONS

The present application is based on, claims priority to, and incorporates by reference in its entirety Chinese patent application number 201711445559.5, filed Dec. 27, 2017.

FIELD OF THE INVENTION

The present disclosure relates to a door lock, and in particular to a refueling or charging port door lock assembly of a vehicle.

BACKGROUND

A fuel vehicle is provided with a refueling port for fuel or oil supply, and an electric vehicle is also correspondingly provided with a charging port for electric power supply. The current refueling or charging port is covered by a flap, and a door lock is used to lock the flap on the refueling or charging port. When refueling or charging is required, the flap can open to expose the refueling or charging port, and then can close after replenishment of fuel or electric power. However, in the process of opening and closing the flap of the current refueling or charging port, the movement speed of the flap cannot be controlled, causing the flap to shake and fail to open at a constant speed and in a steady manner.

SUMMARY OF THE INVENTION

In order to solve the above-mentioned problems, an object of the present disclosure is to provide a refueling or charging port door lock assembly, which can realize the opening of a refueling or charging port flap at a constant speed and in a steady manner.

In order to achieve the above-mentioned object, the present disclosure provides a refueling or charging port door lock assembly, comprising: a housing having a hollow structure; a lifting shaft provided inside the housing, with a top end of the lifting shaft being configured for assembling a refueling or charging port flap, the lifting shaft being rotationally fixed and linearly movable relative to the housing along a first portion and threadably engaged with the housing along a second portion; a driving spring, with one end of the driving spring being fixed, and the other end thereof abutting against the lifting shaft for driving the lifting shaft to move relative to the housing; and a buffering device configured to provide a buffering function as the second portion moves relative to the housing.

According to the refueling or charging port door lock assembly described above, an upper part of the housing is provided with a mounting plate and the buffering device is connected to the mounting plate.

According to the refueling or charging port door lock assembly described above, the buffering device comprises: a gear mounted to an upper part of the lifting shaft; and a damper mounted above the mounting plate and meshes with the gear.

According to the refueling or charging port door lock assembly described above, the lifting shaft has a hollow cylinder shape, the one end of the driving spring is fixed to a lower end of the housing, and the other end thereof abuts against the inside of the lifting shaft.

According to the refueling or charging port door lock assembly described above, the lifting shaft is provided with at least one guide groove thereon, an upper part of the at least one guide groove is a linear guide groove, and a lower part thereof is a rotary guide groove; an inner wall of the housing is provided with at least one guide pin, and the guide pin can move in the guide groove, such that the lifting shaft can move linearly along the first portion and move linearly and rotationally along the second portion relative to the housing; and an inner wall of the gear is provided with at least one limiting pin, and the limiting pin can move in the guide groove, such that the gear does not move with the lifting shaft when the first portion is engaged with the guide pin and the lifting shaft drives the gear to rotate when the second portion is engaged with the guide pin.

According to the refueling or charging port door lock assembly described above, the door lock assembly further comprises a locking means, wherein the locking means is mounted to a bottom end of the lifting shaft, the locking means has two working states, including a locking state in which the locking means keeps the driving spring in a compressed state and a releasing state in which the locking means releases the driving spring, so that a restoring force of the driving spring can drive the lifting shaft to move relative to the housing.

According to the refueling or charging port door lock assembly described above, the locking means comprises: a locking ring provided around the bottom end of the lifting shaft, an inner wall of the locking ring being provided with at least one locking protrusion; and a locking chute connected to the bottom end of the guide groove, the locking chute comprising at least one locking groove and at least one inclined driving surface, and the locking groove being in shape fit with the locking protrusion; wherein the locking ring can be driven by the inclined driving surface to rotate, so that the locking protrusion is accommodated in the locking groove, or that the locking protrusion is released from the locking groove.

According to the refueling or charging port door lock assembly described above, the number of the at least one guide groove is five, the number of the at least one guide pin is five, the number of the at least one limiting pin is also five, and each of the guide pin or limiting pin can slide in the respective guide groove.

According to the refueling or charging port door lock assembly described above, an outer wall of the locking ring is provided with at least one elastic rib, one end of the elastic rib is fixed to the outer wall of the locking ring, and the other end thereof extends outwards freely, such that the locking ring can rotate only in one direction.

According to the refueling or charging port door lock assembly described above, the housing comprises: an upper housing comprising an accommodation cavity configured for mounting the buffering device; a lifting shaft housing configured for accommodating the lifting shaft; and a bottom cover, the one end of the driving spring being fixed to the bottom cover; wherein the upper housing is connected to a top end of the lifting shaft housing, and the bottom cover is connected to a bottom end of the lifting shaft housing.

The refueling or charging port door lock assembly according to the present disclosure uses the driving spring in the compressed state to drive the lifting shaft to slide relative to the housing along a first portion of the lifting shaft and the threadably move relative to the housing along a second portion of the lifting shaft, thus driving the refueling or charging port flap that is assembled at the top end of the lifting shaft to move together, and enabling the refueling or charging port flap to be opened or closed. In the present disclosure, the movement speed of the lifting shaft is controlled by providing the buffering device, such that the refueling or charging port flap can be opened or closed at a constant speed and steadily when the driving spring drives the lifting shaft to move relative to the housing. In addition, the refueling or charging port door lock assembly according to the present disclosure is provided with the housing, the lifting shaft and the driving spring in sequence from outside to inside, which on the one hand can make the movement of the lifting shaft more steady, and on the other hand can increase the diameter of the lifting shaft to further contribute to the steady movement of the lifting shaft.

DETAILED DESCRIPTION OF EMBODIMENTS

Various embodiments of the present disclosure are described below with reference to the accompanying drawings which constitute part of the description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating orientations are only illustrative and should not be considered as limitations.

Figure 1A:
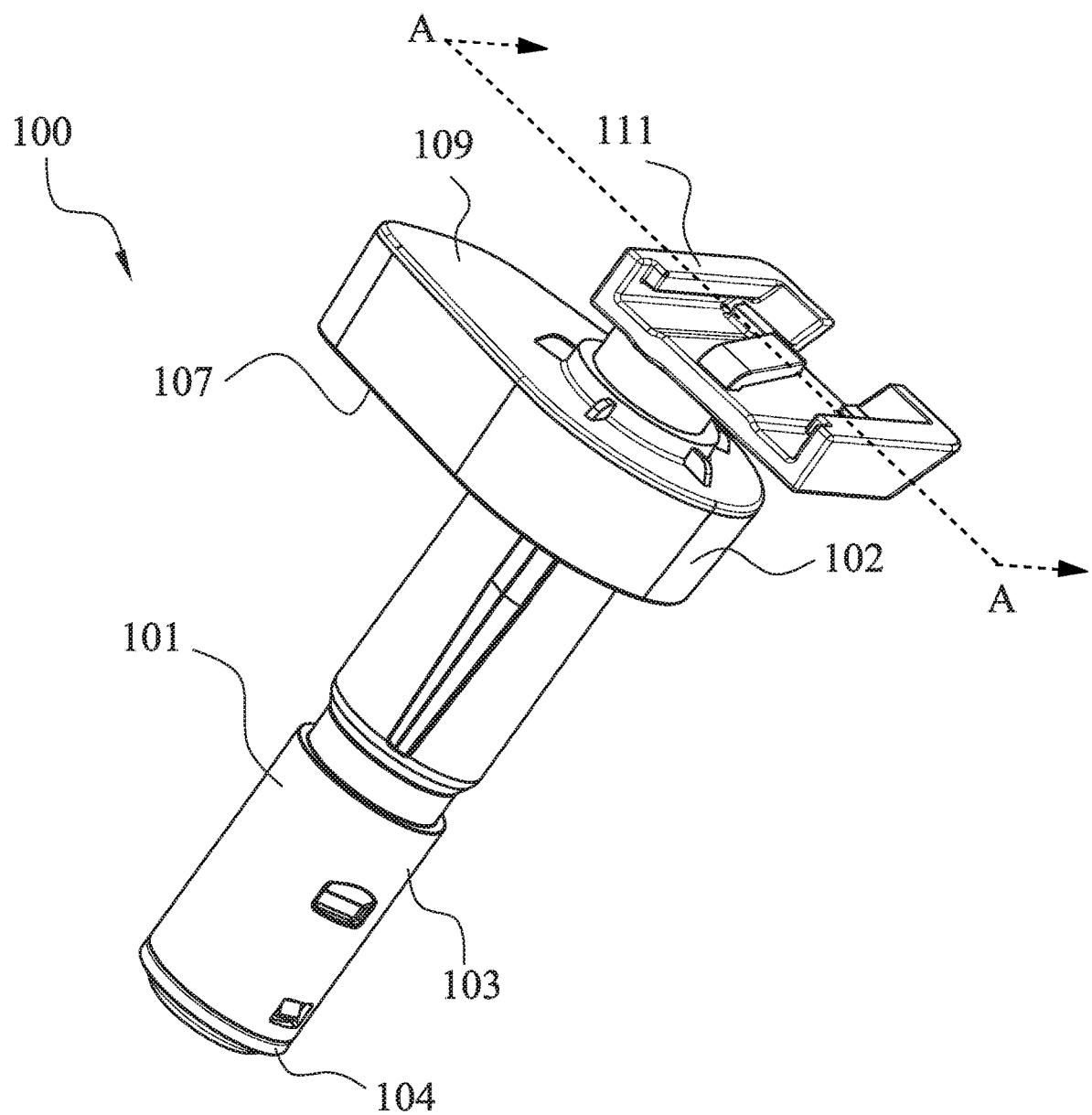
FIG. 1A is a perspective view of a refueling or charging port door lock assembly according to an embodiment of the present disclosure.
Figure 1B:
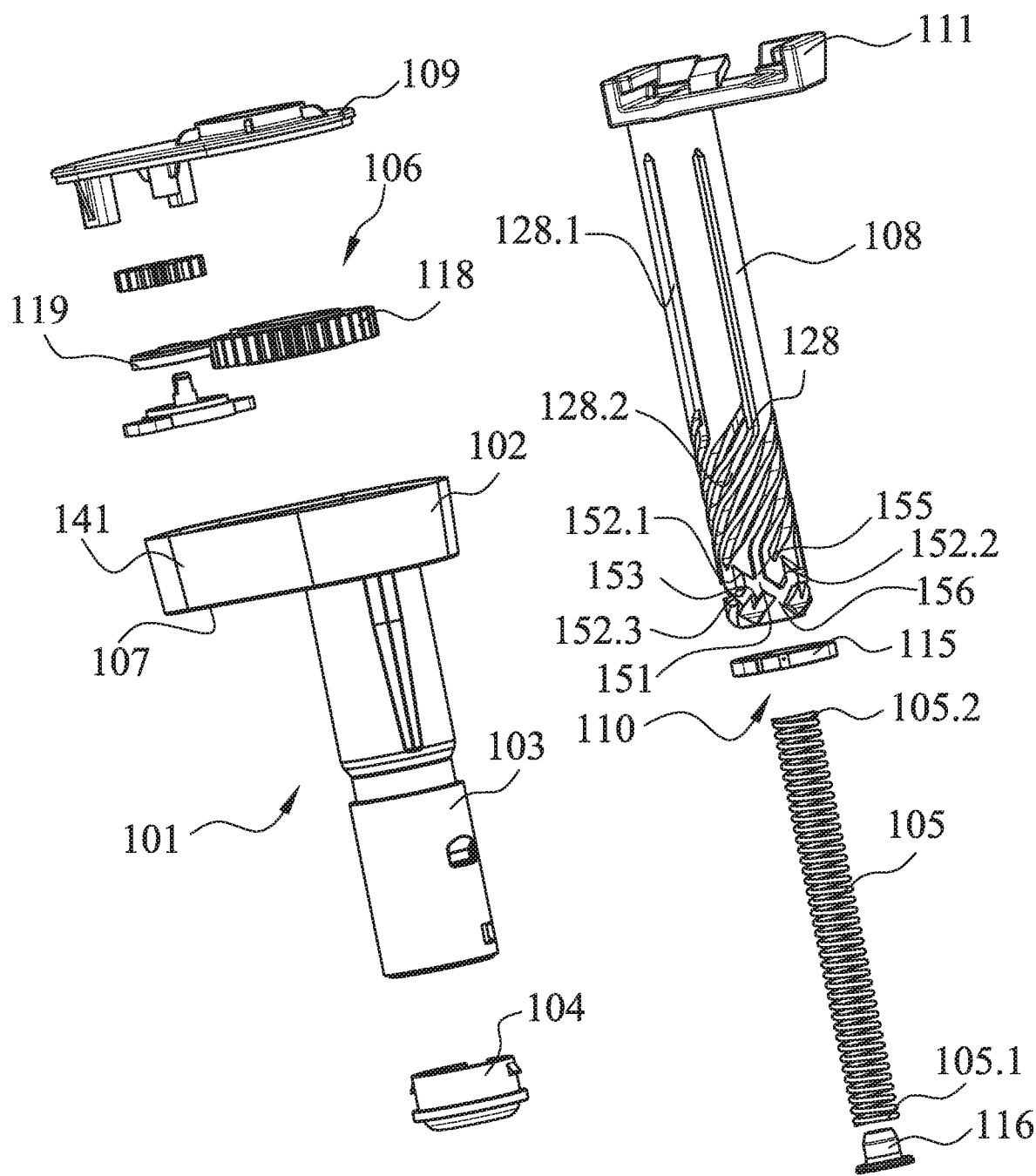
FIG. 1B is an exploded view of the refueling or charging port door lock assembly of FIG. 1A, showing the structure of component parts of the refueling or charging port door lock assembly.
Figure 1C:
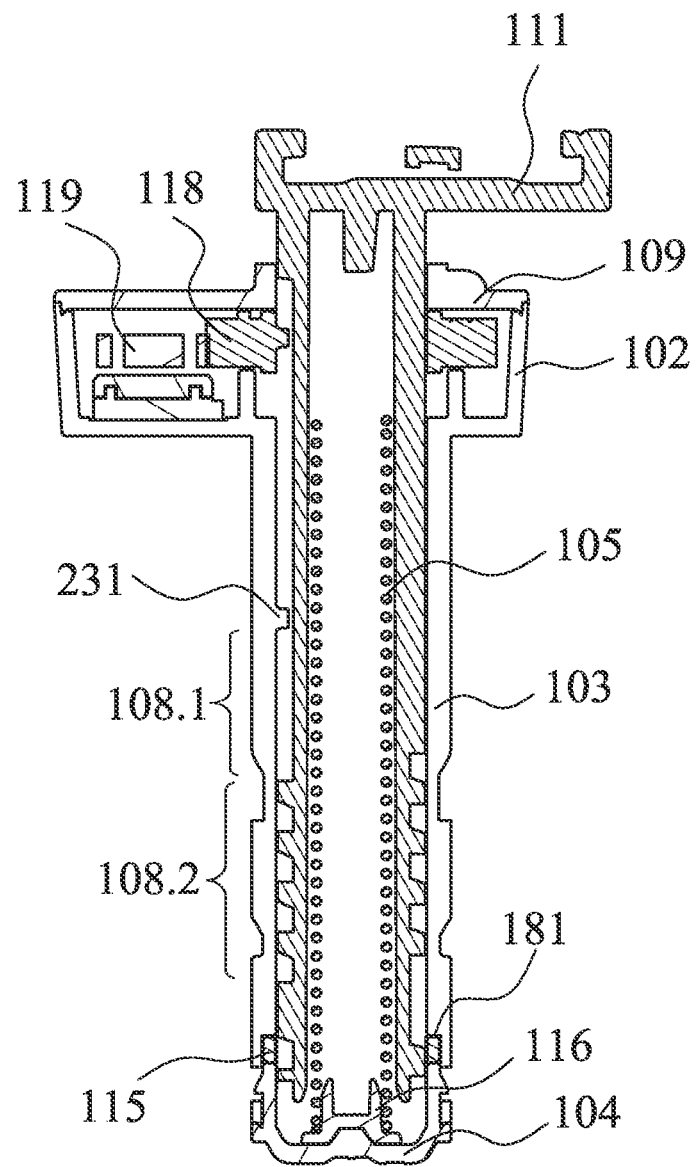
FIG. 1C is a section view of FIG. 1A taken along line A-A.
Figure 8A:
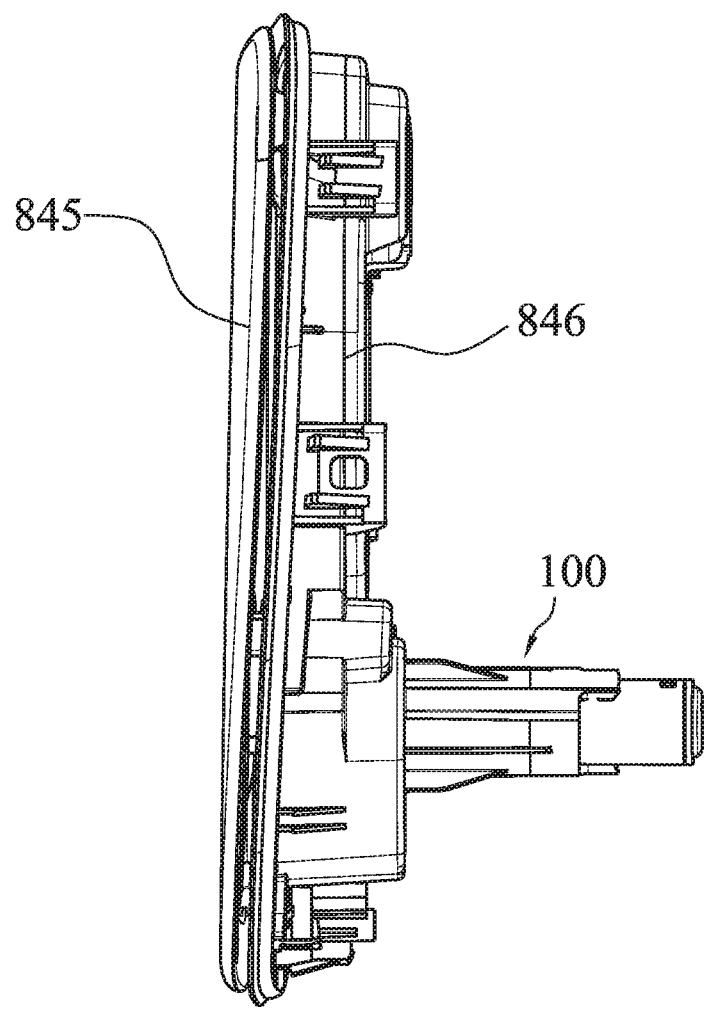
FIG. 8A is a side view of a refueling or charging port assembly in the state shown in FIG. 7A.
Figure 8B:
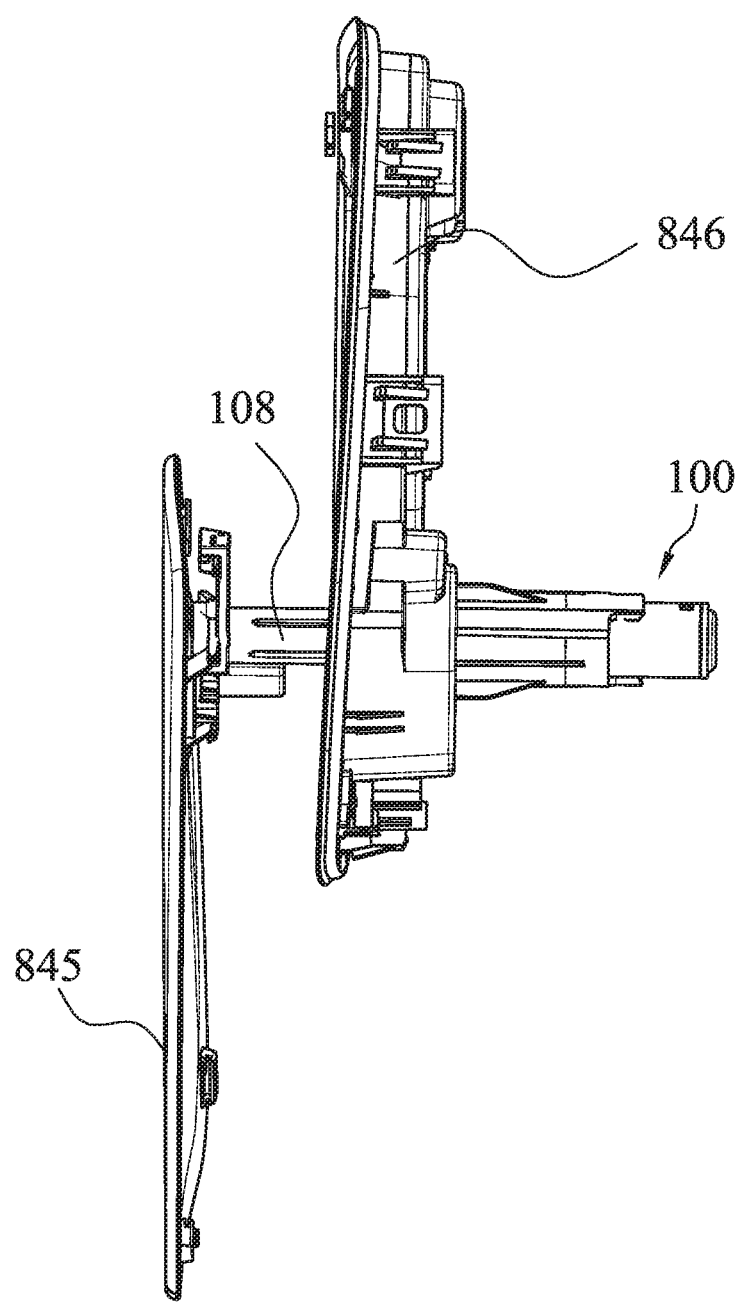
FIG. 8B is a side view of the refueling or charging port assembly in the state shown in FIG. 7C.
Figure 8C:
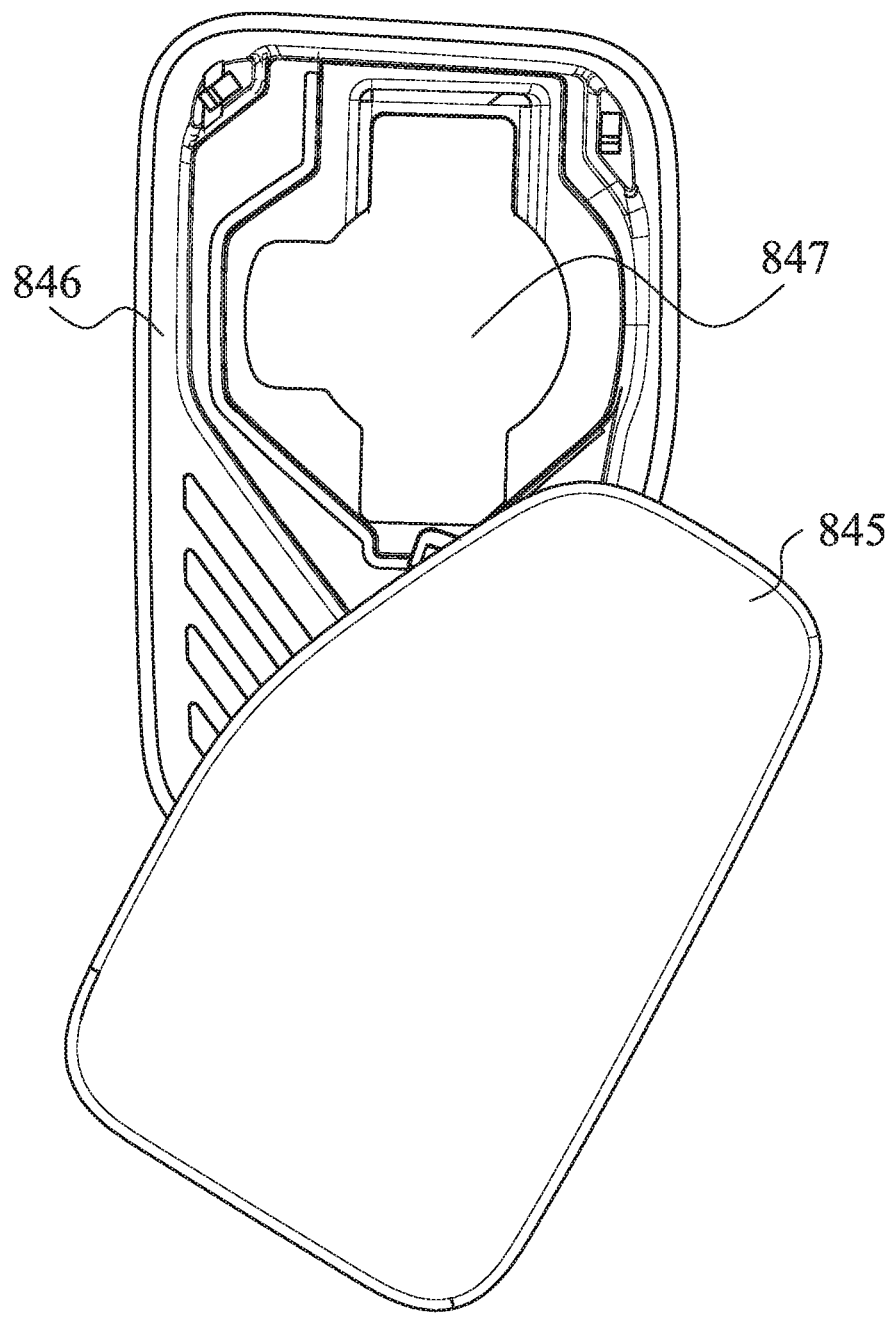
FIG. 8C is a top view of the refueling or charging port assembly shown in FIG. 8B, showing the relationship between the refueling or charging port and the refueling or charging port flap.

FIGS. 1A-1C illustrate overall structural views of a refueling or charging port door lock assembly 100 according to an embodiment of the present disclosure, wherein FIG. 1A is a perspective view of the door lock assembly 100, FIG. 1B is an exploded view of FIG. 1A, and FIG. 1C is a section view of FIG. 1A taken along line A-A. The refueling or charging port door lock assembly 100 according to the present disclosure is used in a refueling or charging port assembly shown in FIGS. 8A, 8B and 8C. Specifically, as shown in FIGS. 8A, 8B and 8C, the refueling or charging port assembly comprises a bottom shell 846 and a flap 845. The flap 845 can cover the bottom shell 846 to block a refueling or charging port 847, or the flap 845 is rotated and opened to expose the refueling or charging port 847. The refueling or charging port door lock assembly 100 passes through the bottom shell 846 and is mounted to the bottom shell 846, the flap 845 is connected at the top of the refueling or charging port door lock assembly 100, so that the refueling or charging port door lock assembly 100 can drive the flap 845 to move relative to the bottom shell 846, thus closing or exposing the refueling or charging port 847.

As shown in FIG. 1A, the door lock assembly 100 comprises a housing 101, and the housing 101 is hollow. The housing 101 can be mounted to the bottom shell 846, and thus the housing 101 is immobile relative to the body of a vehicle mounted with the refueling or charging port door lock assembly 100 according to the present disclosure. In order to show the structure of parts inside the housing 101, FIG. 1B shows an exploded view of FIG. 1A. As shown in FIGS. 1A and 1B, the door lock assembly 100 comprises, in addition to the housing 101, a lifting shaft 108, a driving spring 105 and a buffering device 106. The flap 845 is connected at the upper end of the lifting shaft 108, and the lifting shaft 108 moves to open or close the refueling port flap 845. The housing 101 can accommodate the lifting shaft 108 and limit the axial and rotational movements of the lifting shaft 108. The driving spring 105 is used for driving the lifting shaft 108, and the buffering device 106 is used for buffering the movement of the lifting shaft 108. The door lock assembly 100 further comprises a locking means 110 for locking or releasing the lifting shaft 108. The locking means 110 comprises a locking ring 115.

Figure 2A:
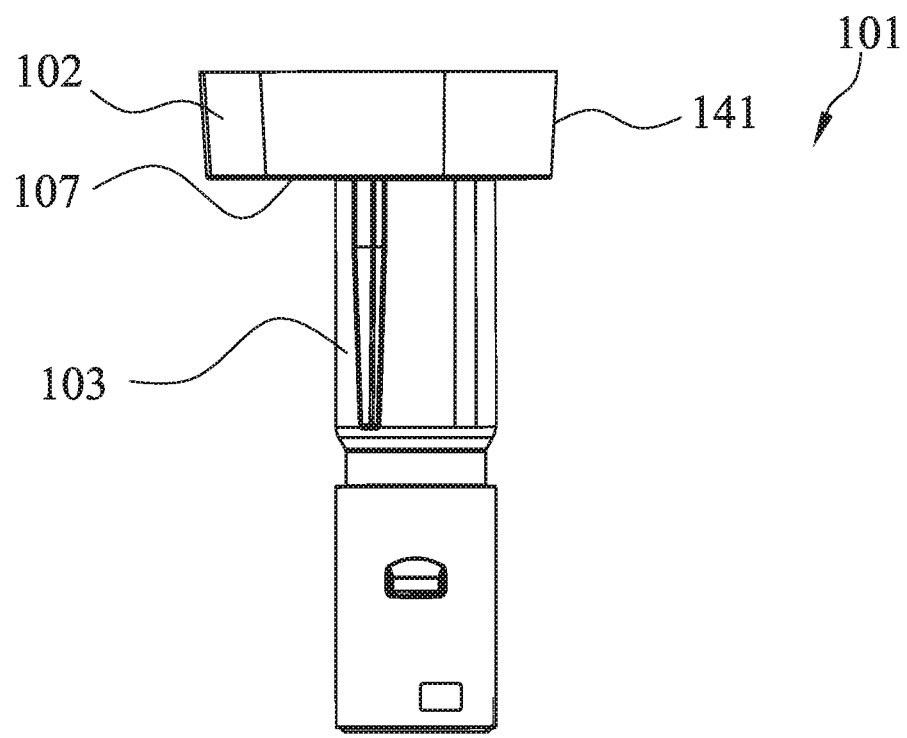
FIG. 2A is a side view of a housing in FIG. 1B, showing an upper housing and a lifting shaft housing.
Figure 2B:
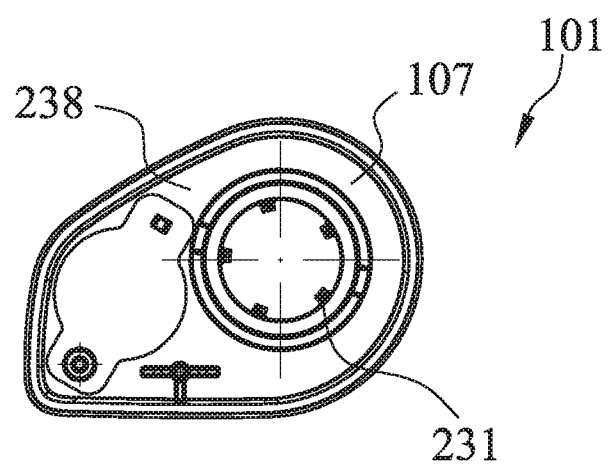
FIG. 2B is a top view of the housing in FIG. 2A, showing guide pins on an inner wall of the lifting shaft housing.

The housing 101 is described below with reference to FIGS. 1B, 1C, 2A and 2B, wherein FIG. 2A is a side view of the housing in FIG. 1B and shows an upper housing 102 and a lifting shaft housing 103, and FIG. 2B is a top view of the housing in FIG. 2A and shows guide pins 231 on an inner wall of the lifting shaft housing. A bottom cover 104 of the housing 101 and a top cover 109 of the upper housing 102 are removed in FIGS. 2A and 2B.

As shown in FIGS. 1A, 1B, 1C, 2A and 2B, the housing 101 comprises the upper housing 102, the lifting shaft housing 103 and the bottom cover 104. The lifting shaft housing 103 has a hollow cylinder shape. The upper housing 102 is provided at an upper end of the lifting shaft housing 103, the bottom cover 104 is provided at a lower end of the lifting shaft housing 103, and an inner space of the lifting shaft housing 103 is in communication with an inner space of the upper housing 102 and an inner space of the bottom cover 104. The lifting shaft 108 can be accommodated in the lifting shaft housing 103, and the upper end of the lifting shaft 108 can pass through the upper housing 102 and extends from the upper housing 102, so as to connect with the refueling or charging port flap 845 (as shown in FIG. 8A).

The upper housing 102 accommodates and bears the buffering device 106, so that the buffering device 106 is immobile relative to the housing 101. The upper housing 102 comprises a mounting plate 107 at the bottom of the upper housing 102, a top cover 109 at the top of the upper housing 102, and an upper housing wall 141 between the mounting plate 107 and the top cover 109, which define and form an accommodation cavity 238. The accommodation cavity 238 is used for accommodating the buffering device 106. The height of the upper housing wall 141 matches that of the buffering device 106, thus limiting the movement of the buffering device 106 in an axial direction, so that the buffering device 106 does not move axially relative to the housing 101. However, a person skilled in the art should understand that the upper housing 102 in other examples can also be of other structures, and other methods can be used to bear the buffering device 106. For example, the upper housing 102 only comprises the mounting plate 107, and the buffering device 106 is fixed to the mounting plate 107, which can also limit the movement of the buffering device 106 in the axial direction.

The inner wall of the lifting shaft housing 103 is provided with several guide pins 231 protruding inwards (as shown in FIG. 2B), for example, five evenly arranged guide pins 231. The guide pins 231 (as shown in FIG. 1C) are used for cooperating with the lifting shaft 108 (as shown in FIG. 1C) to control the axial and rotational movements of the lifting shaft 108.

The bottom cover 104 provided at the lower end of the lifting shaft housing 103 is used for closing the lifting shaft housing 103 and for supporting the fixed end 105.1 of the driving spring 105. The bottom cover 104 can be integrally molded with the lifting shaft housing 103, and they can also be separately molded and then connected together by means of a snap structure, for example. In addition, the upper housing 102 and the lifting shaft housing 103 can also be integrally molded or separately molded and then connected together. As an example of the present disclosure, the mounting plate 107 and the upper housing wall 141 of the upper housing 102 are integrally molded with the lifting shaft housing 103, and the top cover 109 and the upper housing wall 141 are separately molded and then connected together.

Figure 3:
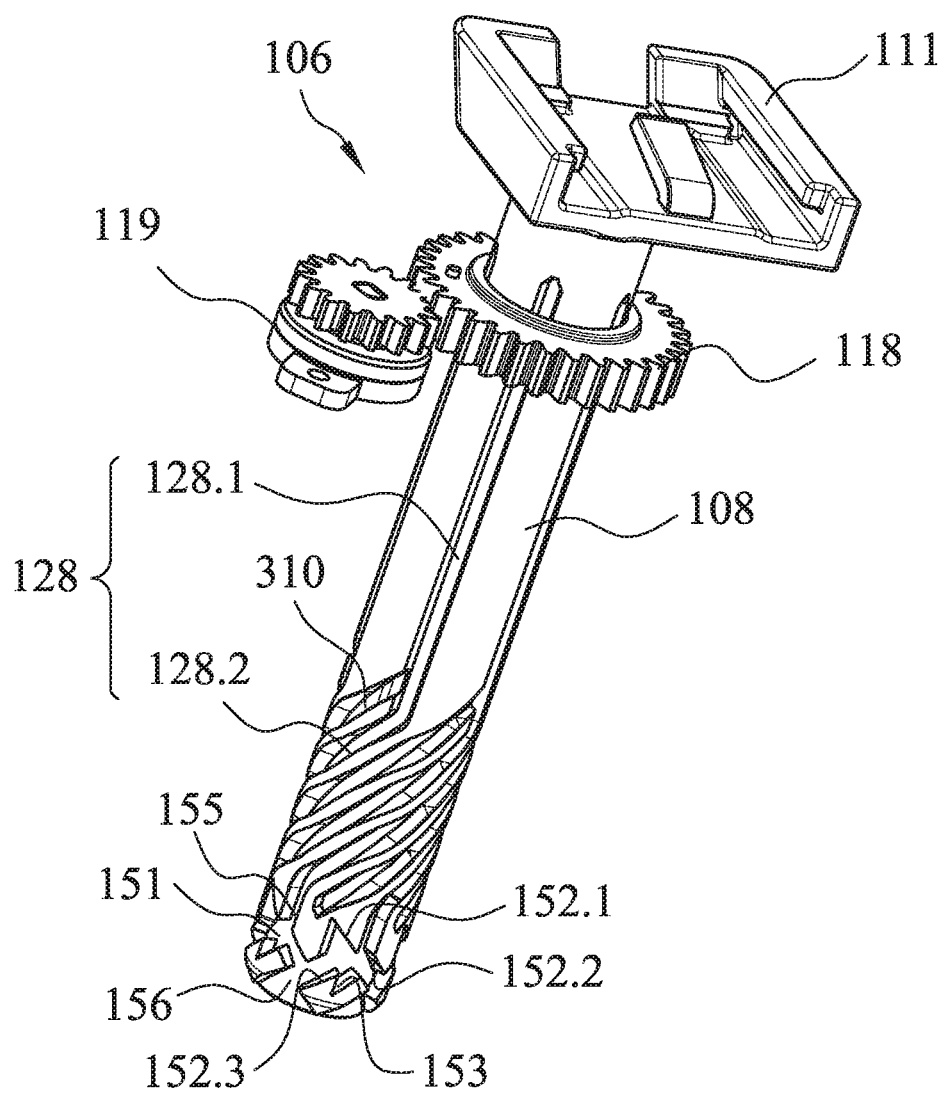
FIG. 3 is a perspective view showing a lifting shaft and a buffering device in FIG. 1B.

The lifting shaft 108 is introduced with reference to FIGS. 1B and 3, wherein FIG. 3 is a perspective view of the door lock assembly 100 in FIG. 1A after the housing 101 is removed, showing the lifting shaft 108 and the buffering device 106 in FIG. 1B. As shown in FIGS. 1B and 3, a flap mounting part 111 is provided at the upper end of the lifting shaft 108 that protrudes through the upper housing 102, and is used for connecting with the refueling or charging port flap 845, so that the moving lifting shaft 108 can drive the refueling or charging port flap 845 to move along with it.

An outer surface of the lifting shaft 108 is provided with several guide grooves 128, and the number of the guide grooves 128 is set to correspond to the number of guide pins 231 on the inner wall of the lifting shaft housing 103, for example, five evenly arranged guide grooves 128. Each guide groove 128 comprises an upper linear guide groove 128.1 and a lower rotary guide groove 128.2. A bottom end of the rotary guide groove 128.2 is closed. The guide pins 231 on the inner wall of the lifting shaft housing 103 can move in the guide grooves 128. With particular reference to FIG. 1C, since the lifting shaft housing 103 is immobile, when a force is applied to the lifting shaft 108 along its axial direction, the guide pins 231 cooperate with the linear guide grooves 128.1 such that the lifting shaft 108 can move up or down linearly relative to the lifting shaft housing 103 along a first portion 108.1 of the lifting shaft 108 (a first travel), and the guide pins 231 cooperate with the rotary guide grooves 128.2 such that the lifting shaft 108 can move up or down while rotating relative to the lifting shaft housing 103 along a second portion 108.2 of the lifting shaft 108 (a second travel). It should be appreciated the rotary guide grooves 128.2 act as screw threads. In other words, the lifting shaft is rotationally fixed and axially slidably engaged with the lifting shaft housing 103 along the first portion 108.1 and threadably engaged with the lifting shaft housing 103 along the second portion 108.2. A mounting groove 310 is also provided between adjacent rotary guide grooves 128.2, and the top of each mounting groove 310 is in communication with one respective linear guide groove 128.1.

A locking chute 151 is provided at the bottom of the lifting shaft 108, and the locking chute 151 and the locking ring 115 together form the locking means 110 for locking or releasing the lifting shaft 108. Specifically, the locking chute 151 comprises several first inclined driving surfaces 152.1 and several second inclined driving surfaces 152.2 which are spaced apart and inclined in the same direction, and the second inclined driving surfaces 152.2, compared with the first inclined driving surfaces 152.1, are more close to a bottom end of the lifting shaft 108. The number of the first inclined driving surfaces 152.1 and the second inclined driving surfaces 152.2 are the same as that of the rotary guide grooves 128.2, for example, five in each case. A first spacing 155 is provided between a first inclined driving surface 152.1 and a second inclined driving surface 152.2 which are adjacent to each other. Each first spacing 155 is in communication with the corresponding mounting groove 310, so that when the lifting shaft housing 103 is mounted, the guide pins 231 can enter the guide grooves 128 through the first spacings 155 and the mounting grooves 310, thus the lifting shaft 108 can be mounted into the lifting shaft housing 103 in a cooperative manner.

Figure 4A:
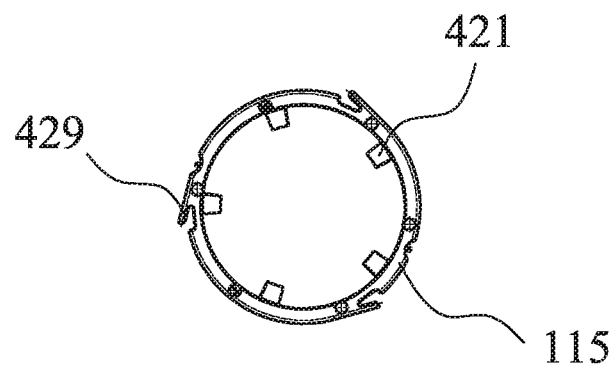
FIG. 4A is a top view of a locking ring in FIG. 1B, showing the structure of an inner wall and an outer wall of the locking ring.

The locking chute 151 further comprises several locking grooves 153, and the locking grooves 153 are respectively arranged under the corresponding first inclined driving surfaces 152.1. Each locking groove 153 is formed of a V-shaped block, a third inclined driving surface 152.3 is provided on an outer side of the locking groove 153 close to the corresponding first inclined driving surface 152.1, and an inclination direction of the third inclined driving surface 152.3 is opposite to that of the first inclined driving surface 152.1. The bottom of the locking groove 153 is in shape fit with a locking protrusion 421 (as shown in FIG. 4A) provided on the locking ring 115 for locking the lifting shaft 108. A second spacing 156 is formed between adjacent and spaced V-shaped blocks, and the second spacings 156 are located under the corresponding second inclined driving surfaces 152.2 and are in communication with the bottom end of the lifting shaft 108.

Figure 4B:
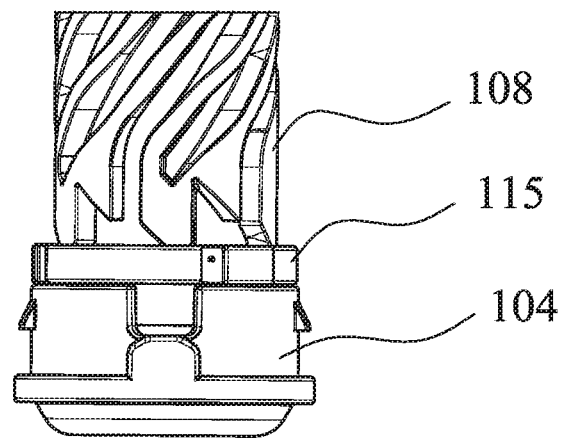
FIG. 4B is an enlarged view of the door lock assembly in FIG. 1A at the bottom of the lifting shaft with the lifting shaft housing removed, showing the assembly relationship between the lifting shaft, the locking ring and a bottom cover.

FIG. 4A is a top view of the locking ring 115 in FIG. 1B, showing the specific structure of an inner wall and an outer wall of the locking ring 115. FIG. 4B is an enlarged view of the door lock assembly 100 in FIG. 1A, after the lifting shaft housing 103 is removed, at the bottom of the lifting shaft 108, showing the assembly relationship between the lifting shaft 108, the locking ring 115 and the bottom cover 104. As shown in FIG. 4B, the locking ring 115 is sleeved on a lower end of the lifting shaft 108 and arranged between the lower end of the lifting shaft 108 and the lower end of the lifting shaft housing 103. The inner wall of the lifting shaft housing 103 is provided with a blocking member 181 (as shown in FIG. 1C), for clamping the locking ring 115 between the blocking member 181 and the bottom cover 104 to limit the movement of the locking ring 115 in the axial direction of the lifting shaft 108. As shown in FIG. 4A, the outer wall of the locking ring 115 is provided with a plurality of elastic ribs 429, for example, three evenly arranged elastic ribs 429. One end of the elastic rib 429 is fixed to the outer wall of the locking ring 115, and the other end thereof extends outwards freely, and the elastic rib 429 cooperates with a protrusion (not shown) on the inner wall of the lifting shaft housing 103 to limit the rotational direction of the locking ring 115, so that the locking ring 115 can rotate only in one direction. As shown in FIG. 4A, the locking ring 115 can only rotate clockwise, but not counter-clockwise. Thus, the locking ring 115 cannot move in the axial direction of the lifting shaft 108 or rotate counter-clockwise, but can only rotate clockwise. It should be noted that the specific rotational direction of the locking ring 115 is described above, but in fact, the rotational direction of the locking ring 115 is associated with the inclination direction of the first inclined driving surfaces 152.1, which will be explained in the following description.

The inner wall of the locking ring 115 is provided with a plurality of locking protrusions 421, and the number of the locking protrusions 421 matches that of the locking grooves 153 on the lifting shaft 108, for example, five. Each locking protrusion 421 takes the shape matching the locking groove 153, such as a triangular profile (see the locking protrusion 421 in FIGS. 7A-7C), so that the locking protrusion 421 can be accommodated at the bottom of the locking groove 153. The working process of the locking means 110 will be described in detail later with reference to FIGS. 7A-7C.

Continued reference is made to FIG. 3. FIG. 3 shows the assembly relationship between the buffering device 106 and the lifting shaft 108. The buffering device 106 can absorb the vibration generated by the lifting shaft 108 in the process of movement, so that the lifting shaft 108 moves steadily and at a constant speed. As shown in FIG. 3, the buffering device 106 is provided at the upper part of the lifting shaft 108, and thus can buffer vibrations along a majority of the length of the lifting shaft 108. Specifically, the buffering device 106 comprises a gear 118 and a damper 119, wherein the gear 118 is sleeved on the lifting shaft 108, and the damper 119 has a gear 626 (see FIG. 6) meshing with the gear 118.

Figure 5A:
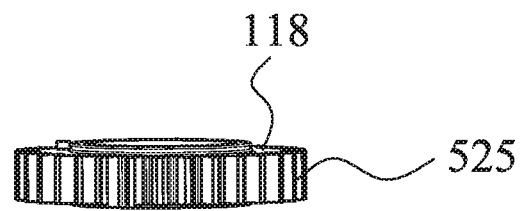
FIG. 5A is a side perspective view of a gear in FIG. 1B.
Figure 5B:
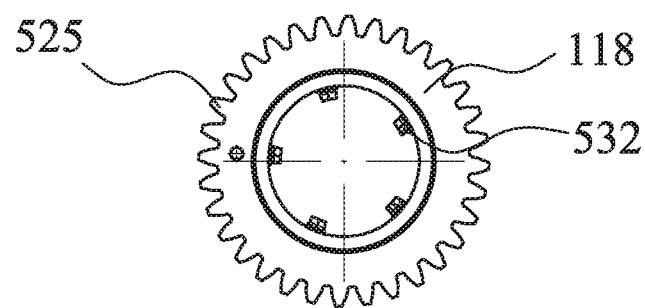
FIG. 5B is a top view of the gear in FIG. 5A, showing limiting pins on an inner wall of the gear and teeth on an outer wall of the gear.

FIGS. 5A and 5B show the specific structure of the gear 118, wherein FIG. 5A is a side perspective view of the gear 118, and FIG. 5B is a top view of the gear 118, showing limiting pins 532 on an inner wall of the gear and teeth 525 on an outer wall of the gear 118. As shown in FIGS. 3, 5A and 5B, the outer wall of the gear 118 is provided with the teeth 525, the middle portion of the gear 118 is hollowed, and the inner wall of the gear 118 is provided with several limiting pins 532. The number of the limiting pins 532 corresponds to the number of the guide grooves 128 on the lifting shaft 108, for example, five. The limiting pins 532 can also be inserted into the guide grooves 128 on the lifting shaft 108, so that through the cooperation of the limiting pins 532 and the guide grooves 128, the gear 118 can be driven by the rotating lifting shaft 108 (i.e., along the second portion 108.2) to rotate, and the gear 118 is not driven by the lifting shaft 108 to move when the lifting shaft 108 ascends or descends (i.e., along the first portion 108.1). Since the buffering device 106 is immobile relative to the housing 101 in the axial direction, when the lifting shaft 108 ascends relative to the housing 101, the buffering device 106 descends relative to the lifting shaft 108, thus the limiting pins 532 descend in the guide grooves 128. In order to ensure that the gear 118 can be driven by the lifting shaft 108 to rotate when the lifting shaft 108 rotates, the position of the gear 118 on the lifting shaft 108 is arranged such that during movement of the lifting shaft 108, the limiting pins 532 are always in the linear guide grooves 128.1, and will not enter the rotary guide groove 128.2 of the lifting shaft 108.

The damper 119 can be any kind of gear damper or damping gear, and a gear of the damper meshes with the gear 118, so that the gear 118 can drive the gear of the damper to rotate. In order to enable the buffering device 106 to provide a retarding force for buffering when the lifting shaft 108 is ascending and rotating along the second portion 108.2 or descending and rotating along the second portion 108.2, the damper 119 is preferably a bidirectional damper.

Figure 6:
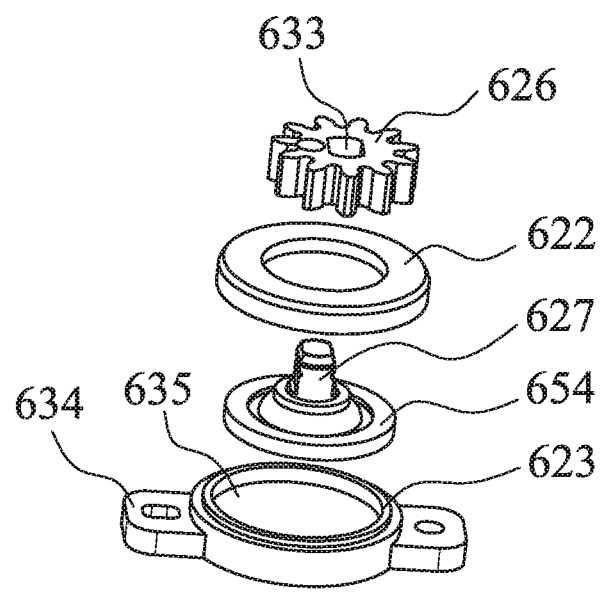
FIG. 6 is an exploded view of a damper in FIG. 1B, showing the specific structure of the damper.

FIG. 6 shows an exploded view of the damper in FIG. 1B, showing the structure of the damper. In an example shown in FIG. 6, the damper 119 comprises the gear 626, an upper cover 622, a base 623 and a rotary plate 654. The rotary plate 654 is provided with a rotary shaft 627. The base 623 is fixedly connected to the mounting plate 107 of the upper housing 102 via bolt fixing parts 634. The upper cover 622 is mounted to the base 623, a cavity 635 is provided between the upper cover 622 and the base 623, and the gear 626 is mounted to an upper surface of the upper cover 622. The rotary plate 654 is provided in the cavity 635, and the rotary shaft 627 extend outwards through the upper cover 622 and the gear 626. As an example, the middle of the gear 626 is provided with an eccentric hole 633, and the portion of an upper end of the rotary shaft 627 in contact with the eccentric hole 633 is configured as an asymmetric shape corresponding to the eccentric hole 633. Thus, the rotary plate 654 can be driven to rotate together with the gear 626 when the gear 626 rotates. The cavity 635 is filled with damping fluid, so that the rotary plate 654 when rotating can rotate steadily and at a constant speed under the retarding force for buffering provided by the damping fluid.

The working method of the buffering device 106 is as follows: when the guide pins 231 are engaged with the first portion 108.1 of the lifting shaft 108, the lifting shaft 108 moves axially relative to the housing 101, and neither the gear 118 nor the damper gear 626 rotates. When the guide pins 231 are engaged with the second portion 108.2 of the lifting shaft 108, the lifting shaft 108 moves in the axial direction and the rotational direction relative to the housing 101, and the rotation of the lifting shaft 108 drives the gear 118 to rotate as well. The damper gear 626 meshing with the gear 118 thus also rotates. The damper 119 provides the retarding force when the gear 626 rotates, thus the rotation of the gear 626 is limited, thereby limiting the rotation of the gear 118, then limiting the rotational speed of the lifting shaft 108, and enabling the lifting shaft 108 to rotate steadily and at a constant speed.

Returning to FIGS. 1A, 1B and 1C, as previously stated, the refueling or charging port door lock assembly 100 further comprises the driving spring 105, one end 105.1 of the driving spring 105 is fixed, and the other end 105.2 abuts against the lifting shaft 108 for driving the axial movement of the lifting shaft 108. As an example, the lifting shaft 108 has a hollow cylinder shape, and the driving spring 105 can be accommodated in the lifting shaft 108. In other examples, the driving spring 105 may not be accommodated in the lifting shaft 108, and it is only necessary to ensure that one end of the driving spring 105 is fixed and the other end abuts against the bottom of the lifting shaft 108.

As shown in FIGS. 1B and 1C, according to an example of the present disclosure, in order to facilitate the fixation of the driving spring 105, the end 105.1 of the driving spring 105 is connected to a central gasket 116. The central gasket 116 is fixed to the bottom cover 104, for example, by bonding. Thus, the end 105.1 of the driving spring is supported on the bottom cover 104, and the end 105.1 of the driving spring is immobile with respect to the housing 101. The end 105.2 of the driving spring 105 abuts against the bottom of the flap mounting part 111 of the lifting shaft 108. Of course, it is also possible to provide a boss on the inner wall of the lifting shaft 108 for the end 105.2 of the driving spring to rest against, and it is only necessary to ensure that the lifting shaft 108 can be subject to a driving force of the driving spring 105. When the door lock assembly 100 of the present disclosure is in a closed state, the locking means 110 is in a locking state, the lifting shaft 108 is locked by the locking means 110, and the driving spring 105 supports the lifting shaft 108 in a compressed state. When the door lock assembly 100 is in an open state, the locking means 110 is in a releasing state, and after the lifting shaft 108 is released by the locking means 110, the lifting shaft 108 is lifted or rotates while being lifted under the drive of the restoring force of the driving spring 105.

After various components shown in FIG. 1B are assembled together, most part or all of the driving spring 105 is accommodated in the lifting shaft 108, and most part of the lifting shaft 108 is accommodated in the housing 101, thus forming the door lock assembly 100 as shown in FIG. 1A. By providing the buffering device 106, the driving spring 105 is retarded by the buffering device 106, and the restoring force cannot be released abruptly. When the lifting shaft 108 is locked by the locking means 110, the buffering device 106 is located at the upper part of the lifting shaft 108, and the buffering device 106 only cooperates with the guide grooves 128 on the surface of the lifting shaft 108, thus the buffering device 106 can buffer the restoring force of the driving spring 105 in the maximum travel range without affecting the ascending or descending of the lifting shaft 108. In addition, in order to match the arrangement of the buffering device 106, the locking means 110 in the present disclosure is arranged at the lower part of the lifting shaft 108, thus, although the door lock assembly 100 of the present disclosure is added with the buffering device 106, the overall height thereof is not significantly increased. Thus, not only can the door lock assembly 100 of the present disclosure realize miniaturization, but it also enables the lifting shaft 108 to move at a constant speed and steadily, thus increasing the service life of the door lock assembly 100 and reducing noises.

Figure 7A:
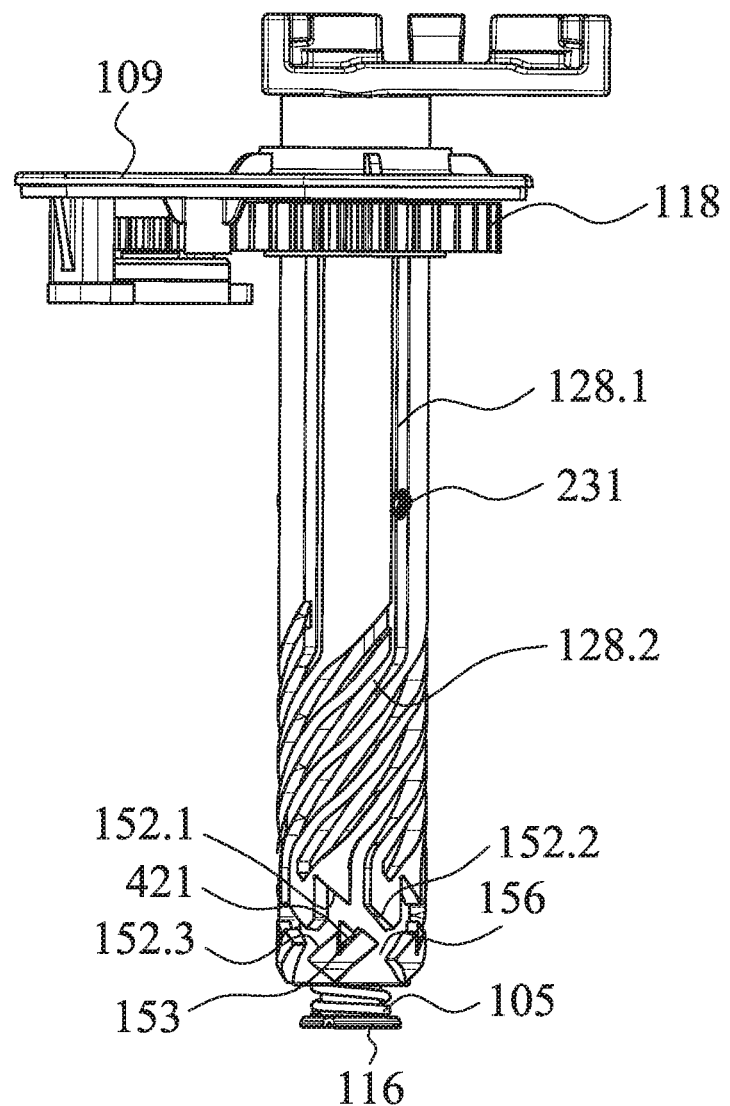
FIG. 7A is a side view of the refueling or charging port door lock assembly of FIG. 1A with the housing removed when a refueling or charging port flap is fully closed.
Figure 7B:
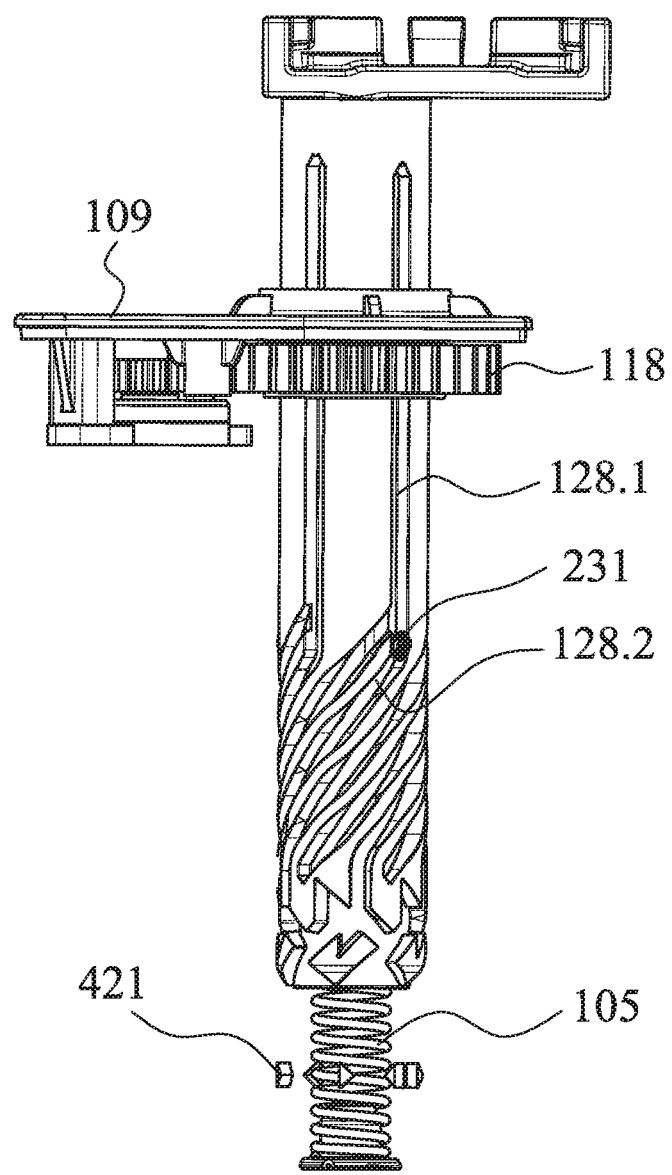
FIG. 7B is a side view of the refueling or charging port door lock assembly of FIG. 1A with the housing removed in the process of opening or closing the refueling or charging port flap.
Figure 7C:
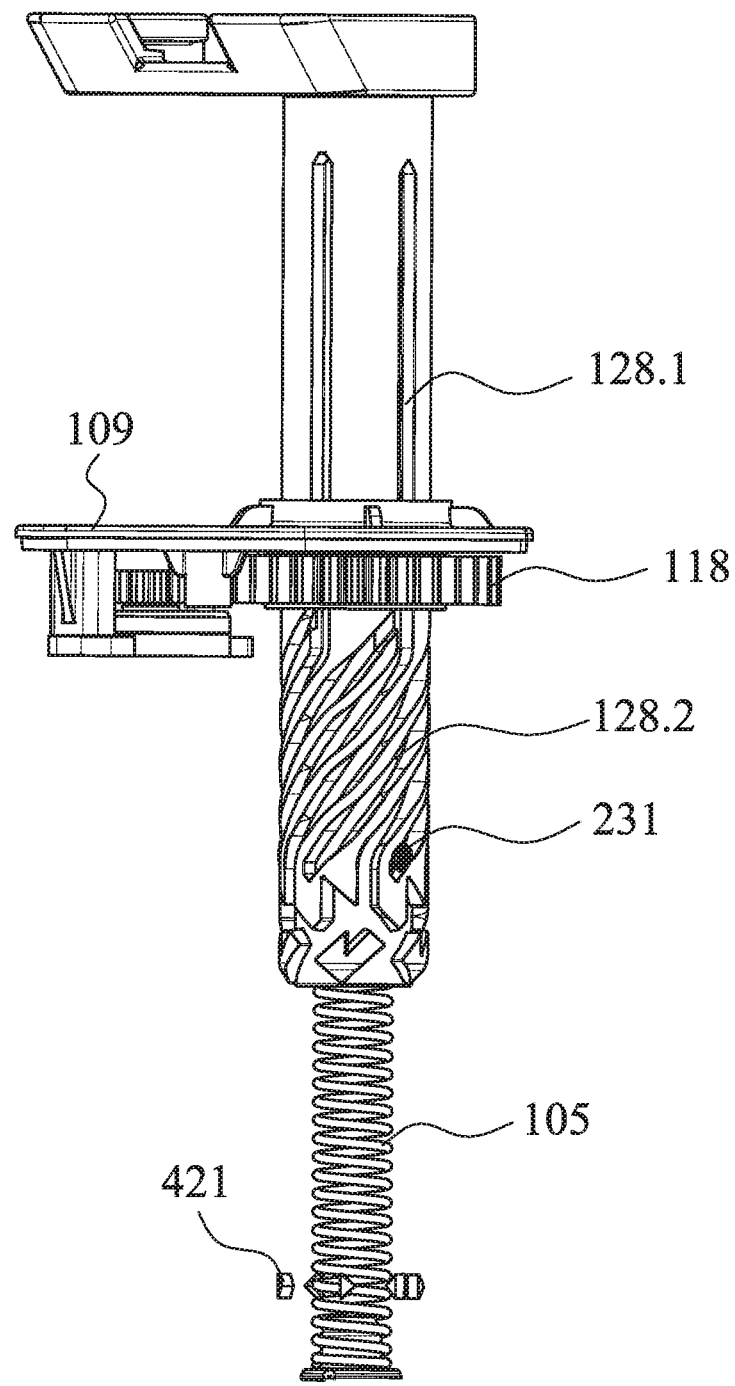
FIG. 7C is a side view of the refueling or charging port door lock assembly of FIG. 1A with the housing removed when the refueling or charging port flap is fully opened.

FIGS. 7A, 7B and 7C show the cooperative relationship between the various components in the door lock assembly 100 of FIG. 1A during the movement of the lifting shaft 108. FIGS. 8A, 8B and 8C show the structural schematic views of a refueling or charging port assembly with the refueling or charging port flap 845 connected to the top end of the lifting shaft 108.

In the figures, FIG. 7A shows the state in which the door lock assembly 100 is closed, FIG. 7B shows the state in the opening process of the door lock assembly 100, and FIG. 7C shows the state in which the door lock assembly 100 is opened. FIG. 8A shows the state in which the door lock assembly 100 is as shown in FIG. 7A and the refueling or charging port flap 845 of the refueling or charging port assembly is also correspondingly closed. FIG. 8B shows the state in which the door lock assembly 100 is as shown in FIG. 7C and the refueling or charging port flap 845 of the refueling or charging port assembly is also correspondingly opened. FIG. 8C is the top view of the refueling or charging port assembly shown in FIG. 8B, showing that the refueling or charging port 847 is exposed when the refueling or charging port flap 845 is in the state as shown in FIG. 8B.

In FIGS. 7A, 7B and 7C, in order to facilitate illustration, most of the housing 101 and the locking ring 115 are removed, and only the top cover 109 of the housing 101, the guide pins 231 on the inner wall of the housing 101, and the locking protrusions 421 on the inner wall of the locking ring 115 are left. In the figures, the sequence from FIG. 7A to FIG. 7B to FIG. 7C represents the process in which the refueling or charging port flap 845 changes from being closed to open, and on the contrary, the sequence from FIG. 7C to FIG. 7B to FIG. 7A represents the process in which the refueling or charging port flap 845 changes from being open to closed.

As shown in FIG. 7A, when the door lock assembly 100 is in the closed state, the locking protrusions 421 of the locking ring 115 are located in the locking grooves 153, the locking means 110 is in the locking state, the lifting shaft 108 is locked, the lifting shaft 108 can move downwards but cannot move upwards relative to the locking ring 115, and the driving spring 105 remains compressed. In this state, the guide pins 231 are located in the middle of the linear guide grooves 128.1, and the limiting pins 532 are located at the upper parts of the linear guide grooves 128.1 (not shown in FIG. 7A).

To open the refueling or charging port flap 845, an external force pressing downwards is applied to the top of the lifting shaft 108, the driving spring 105 continues to be compressed, and the lifting shaft 108 moves downwards for a short distance, so that the locking protrusions 421 are disengaged from the locking grooves 153. As the lifting shaft 108 continues to be pressed downwards, the locking protrusions 421 will come into contact with the first inclined driving surfaces 152.1, and under the action of the first inclined driving surfaces 152.1, the locking ring 115 rotates to the left (i.e., rotating clockwise in FIG. 4A) by a certain angle, such that the locking protrusions 421 move to the top of the first inclined driving surfaces 152.1. At this time, if the external force ceases, the restoring force of the driving spring 105 will drive the lifting shaft 108 to move upwards, the locking protrusions 421 move downwards relative to the lifting shaft 108 until contacting the third inclined driving surfaces 152.3, and under the action of the third inclined driving surfaces 152.3, the locking ring 115 rotates to the left again (i.e., rotating clockwise in FIG. 4A) by a certain angle. Thus, as the lifting shaft 108 moves upwards, the locking protrusions 421 are disengaged from the second spacing 156 and no longer limit the movement of the lifting shaft 108, and the locking means 110 achieves the releasing state. Meanwhile, the guide pins 231, with respect to the lifting shaft 108, move in the axial direction of the lifting shaft 108 from the middle of the linear guide grooves 128.1 to the lower parts of the linear guide grooves 128.1, and the limiting pins 532 (not shown in FIG. 7A) also move downwards at the upper parts of the linear guide grooves 128.1. When released from the state as shown in FIG. 7A, the lifting shaft 108 moves to the position shown in FIG. 7B, and the refueling or charging port flap 845 that is connected at the top end of the lifting shaft 108 extends upwards for a certain distance from the state as shown in FIG. 8A.

As shown in FIG. 7B, at this time, the guide pins 231 are located at the joints of the linear guide grooves 128.1 and the rotary guide grooves 128.2. When the restoring force of the driving spring 105 drives the lifting shaft 108 to continue moving upwards, the guide pins 231 enter the rotary guide grooves 128.2 from the linear guide grooves 128.1. After the guide pins 231 enter the rotary guide grooves 128.2, the lifting shaft 108 can also rotate while ascending, until the guide pins 231 reach the bottommost of the rotary guide grooves 128.2, i.e., the state as shown in FIG. 7C. Meanwhile, the limiting pins 532 are still kept in the linear guide grooves 128.1, and as the lifting shaft 108 rotates, the gear 118 is also driven to rotate. As the damper 119 provides the retarding force to the rotational movement, the restoring force of the driving spring 105 is limited and cannot be released all at once, thus ensuring that the lifting shaft 108 can move at a constant speed and steadily while ascending and rotating. When the lifting shaft 108 moves from the position shown in FIG. 7B to the position shown in FIG. 7C, the refueling or charging port flap 845 that is connected at the top end of the lifting shaft 108 also ascends and rotates.

As shown in FIG. 7C, at this time, the guide pins 231 reach the bottommost of the rotary guide grooves 128.2, the limiting pins 532 also reach the bottom of the linear guide grooves 128.1, and the lifting shaft 108 stops moving. At this time, the refueling or charging port flap 845 that is connected at the top end of the lifting shaft 108 ascends and rotates to a fully open position as shown in FIG. 8B, so that the refueling or charging port 847 is exposed as shown in FIG. 8C.

To close the refueling or charging port flap 845, in contrast to the above process, an external force pressing downwards is applied to the refueling or charging port flap 845 and the door lock assembly 100 returns to the position as shown in FIG. 7B from the state as shown in FIG. 7C. In this process, the lifting shaft 108 descends and rotates, the gear 118 is also driven to rotate, and the damper 119 provides the retarding force to the rotational movement, so that the lifting shaft 108 can rotate and descend steadily, and the driving spring 105 is compressed. The refueling or charging port flap 845 continues to be subject to downward force, the driving spring 105 is further compressed, and the door lock assembly 100 returns to the fully closed state as shown in FIG. 7A from the state as shown in FIG. 7B. In this process, the locking protrusions 421 enter the locking chute 151 of the lifting shaft 108 from the second spacings 156, and as the lifting shaft 108 continues to move downwards, the locking protrusions 421 come into contact with the second inclined driving surfaces 152.2, thus, the locking ring 115 still rotates to the left (i.e., rotating clockwise in FIG. 4A) by a certain angle, so that the locking protrusion 421 reaches above the locking groove 153. When the external force is no longer applied, the restoring force of the driving spring 105 drives the lifting shaft 108 to move upwards at a short distance, the locking protrusions 421 are received in the locking grooves 153, thus the axial movement of the lifting shaft 108 is locked, and the door lock assembly 100 reaches the fully closed state as shown in FIG. 7A.

Although the present disclosure is described with reference to the particular embodiments shown in the accompanying drawings, it should be understood that the refueling or charging port door lock of the present disclosure may have many variations without departing from the spirit and scope of the teaching of the present disclosure. A person of ordinary skill in the art should also be aware that there are different ways to alter the structure of the embodiments disclosed in this application, and all the alterations fall within the spirit and scope of the present disclosure and the claims.

The invention claimed is:

1. A door lock assembly, comprising:
   a housing having a hollow structure and an inner wall provided with at least one guide pin;
   a lifting shaft provided inside the housing and having at least one guide groove, with a top end of the lifting shaft being configured for assembling a refueling or charging port flap, the lifting shaft being rotationally fixed and linearly movable relative to the housing along a first portion and threadably engaged with the housing along a second portion;
   a driving spring, wherein one end of the driving spring is fixed, and the other end thereof abuts against the lifting shaft for driving the lifting shaft to move relative to the housing; and
   a buffering device having a gear mounted to an upper part of the lifting shaft with an inner wall provided with at least one limiting pin, the buffering device immobile relative to the housing, and configured to provide a buffering function as the second portion moves relative to the housing,
   wherein the guide pin can move in the guide groove, and
   wherein the at least one limiting pin can move in the guide groove when the first portion is engaged with the guide pin and the lifting shaft drives the gear to rotate when the second portion is engaged with the guide pin.

2. The door lock assembly according to claim 1, wherein an upper part of the housing is provided with a mounting plate and the buffering device is connected to the mounting plate.

3. The door lock assembly according to claim 2, wherein the buffering device further comprises
   a damper mounted above the mounting plate, and the damper meshing with the gear.

4. The door lock assembly according to claim 1, wherein the lifting shaft has a hollow cylinder shape, and wherein the one end of the driving spring is fixed to a lower end of the housing, and the other end thereof abuts against the inside of the lifting shaft.

5. The door lock assembly according to claim 3, further including:
   an upper part of the at least one guide groove being a linear guide groove, and a lower part thereof being a rotary guide groove,
   wherein the guide pin can move in the guide groove such that the lifting shaft can move linearly along the first portion and move linearly and rotationally along the second portion relative to the housing.

6. The door lock assembly according to claim 5, wherein the door lock assembly further comprises a locking means mounted to a bottom end of the lifting shaft, the locking means having two working states, including a locking state in which the locking means keeps the driving spring in a compressed state and a releasing state in which the locking means releases the driving spring, so that a restoring force of the driving spring can drive the lifting shaft to move relative to the housing.

7. The door lock assembly according to claim 6, wherein the locking means comprises:
   a locking ring provided around the bottom end of the lifting shaft, an inner wall of the locking ring being provided with at least one locking protrusion; and a locking chute connected to the bottom end of the guide groove, the locking chute comprising at least one locking groove and at least one inclined driving surface, wherein the locking groove is in a shape fit with the locking protrusion, and wherein the locking ring can be driven by the inclined driving surface to rotate, so that the locking protrusion is accommodated in the locking groove, or that the locking protrusion is released from the locking groove.

8. The door lock assembly according to claim 5, wherein there are five guide grooves, five guide pins, and five limiting pins, wherein each of the guide pins or limiting pins can slide in the respective guide groove.

9. The door lock assembly according to claim 7, wherein an outer wall of the locking ring is provided with at least one elastic rib, wherein one end of the elastic rib is fixed to the outer wall of the locking ring, and wherein the other end thereof extends outwards freely, such that the locking ring can rotate only in one direction.

10. The door lock assembly according to claim 1, wherein the housing comprises:
   an upper housing comprising an accommodation cavity configured for mounting the buffering device;
   a lifting shaft housing configured for accommodating the lifting shaft; and
   a bottom cover, wherein the one end of the driving spring is fixed to the bottom cover,
   wherein the upper housing is connected to a top end of the lifting shaft housing, and the bottom cover is connected to a bottom end of the lifting shaft housing.

11. A door lock assembly, comprising:
   a housing having a hollow structure, an inner wall provided with at least one guide pin, and an upper housing having a mounting plate at the bottom of the upper housing, a top cover at the top of the upper housing, and an upper housing wall between the top cover and the mounting plate;
   a lifting shaft provided inside the housing with at least one guide groove, with a top end of the lifting shaft being configured for assembling a refueling or charging port flap, the lifting shaft being rotationally fixed and linearly movable relative to the housing along a first portion and threadably engaged with the housing along a second portion;
   a driving spring, wherein one end of the driving spring is fixed, and the other end thereof abuts against the lifting shaft for driving the lifting shaft to move relative to the housing; and
   a buffering device configured to provide a buffering function as the second portion moves relative to the housing and having a gear mounted to an upper part of the lifting shaft, an inner wall of the gear provided with at least one limiting pin,
   wherein the top cover, the mounting plate, and the upper housing wall define and form an accommodation cavity,
   wherein the at least one limiting pin can move in the guide groove such that the gear does not move with the lifting shaft when the first portion is engaged with the guide pin and the lifting shaft drives the gear to rotate when the second portion is engaged with the guide pin, and
   wherein the buffering device is at least in part located within the accommodation cavity.

12. A door lock assembly, comprising:
   a housing having a hollow structure and an inner wall provided with at least one guide pin;
   a lifting shaft provided inside the housing with at least one guide groove, with a top end of the lifting shaft being configured for assembling a refueling or charging port flap, the lifting shaft being rotationally fixed and linearly movable relative to the housing along a first portion and threadably engaged with the housing along a second portion;
   a driving spring, wherein one end of the driving spring is fixed, and the other end thereof abuts against the lifting shaft for driving the lifting shaft to move relative to the housing; and
   a buffering device having a gear mounted to an upper part of the lifting shaft and an inner wall of the gear provided with at least one limiting pin, the buffering device immobile relative to the housing, and configured to provide a buffering function as the second portion moves relative to the housing,
   wherein the gear is sleeved on the lifting shaft,
   wherein the at least one limiting pin can move in the guide groove such that the gear does not move with the lifting shaft when the first portion is engaged with the guide pin and the lifting shaft drives the gear to rotate when the second portion is engaged with the guide pin, and
   wherein when the lifting shaft ascends relative to the housing, the buffering device descends relative to the lifting shaft.

13. The door lock assembly according to claim 11, wherein the buffering device is connected to the mounting plate.

14. The door lock assembly according to claim 12, wherein an upper part of the housing is provided with a mounting plate and the buffering device is connected to the mounting plate.

15. The door lock assembly according to claim 11, wherein the buffering device comprises:
   a damper mounted above the mounting plate, and the damper meshing with the gear.

16. The door lock assembly according to claim 15, further including:
   an upper part of the at least one guide groove being a linear guide groove, and a lower part thereof being a rotary guide groove,
      wherein the guide pin can move in the guide groove such that the lifting shaft can move linearly along the first portion and move linearly and rotationally along the second portion relative to the housing.

17. The door lock assembly according to claim 11, wherein the lifting shaft has a hollow cylinder shape, and wherein the one end of the driving spring is fixed to a lower end of the housing, and the other end thereof abuts against the inside of the lifting shaft.

18. The door lock assembly according to claim 12, wherein the lifting shaft has a hollow cylinder shape, and wherein the one end of the driving spring is fixed to a lower end of the housing, and the other end thereof abuts against the inside of the lifting shaft.

* * * * *